T. H. SCHESCH.
POLISHING MACHINE.
APPLICATION FILED JULY 13, 1909.
1,043,973.
Patented Nov. 12, 1912.
6 SHEETS—SHEET 3.
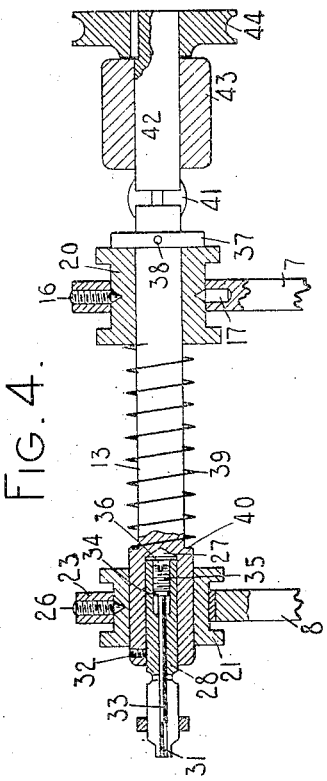
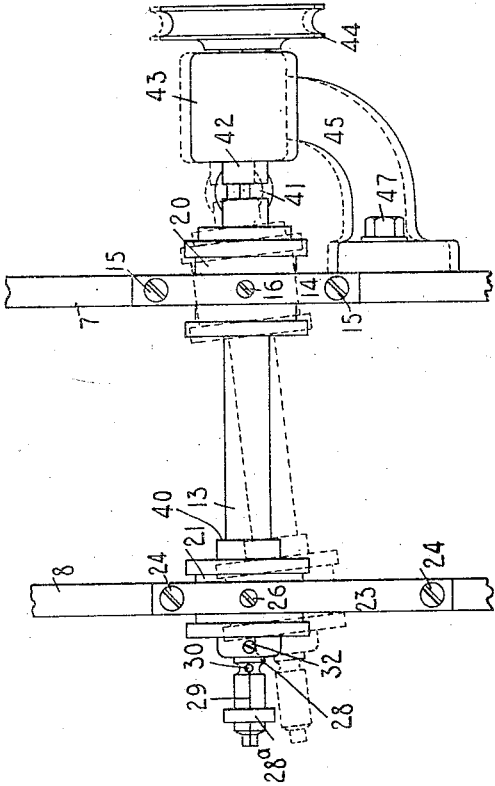
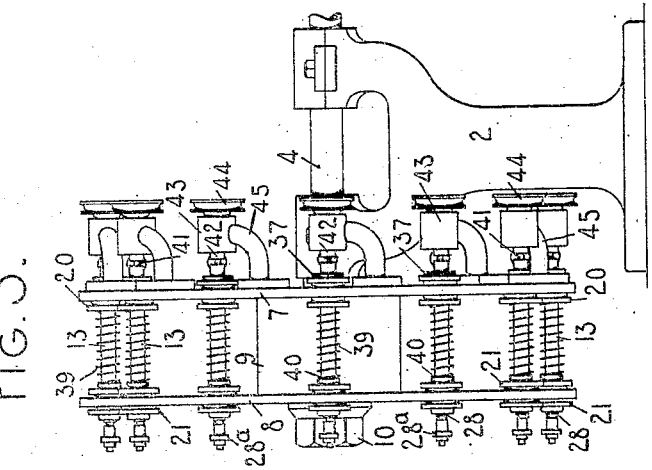
WITNESSES:
INVENTOR
Theodore H. Schesch
By Jacob Felbel
HIS ATTORNEY T. H. SCHESCH.
POLISHING MACHINE.
APPLICATION FILED JULY 13, 1909.
1,043,973.
Patented Nov. 12, 1912.
6 SHEETS—SHEET 4.
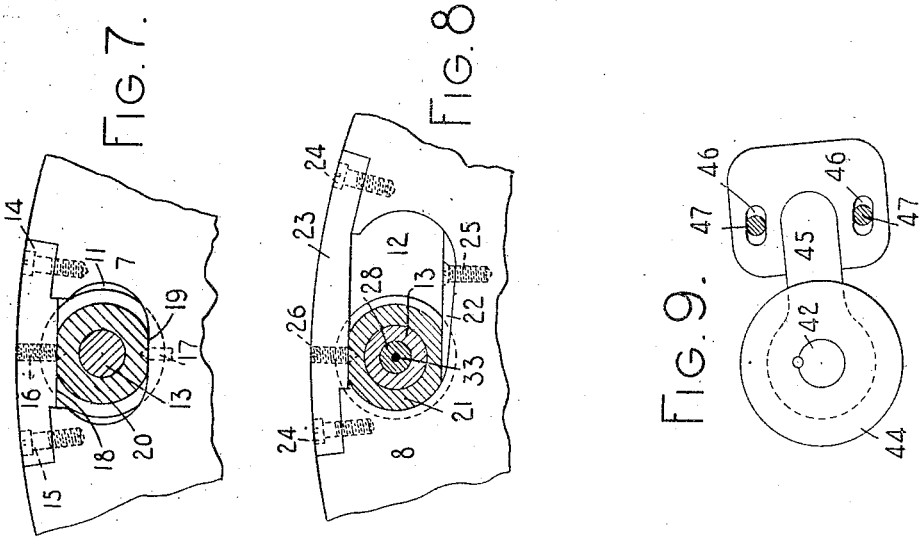
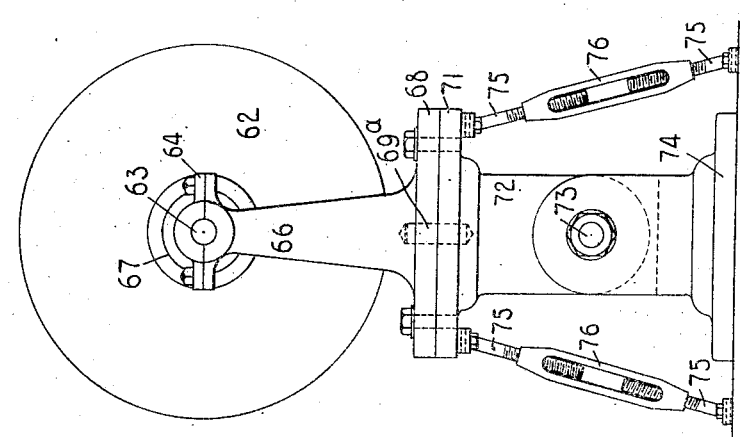
WITNESSES:
E. M. Wells
Charles E. Smith
INVENTOR.
Theodore H. Schesch
By Jacob Felbel
HIS ATTORNEY

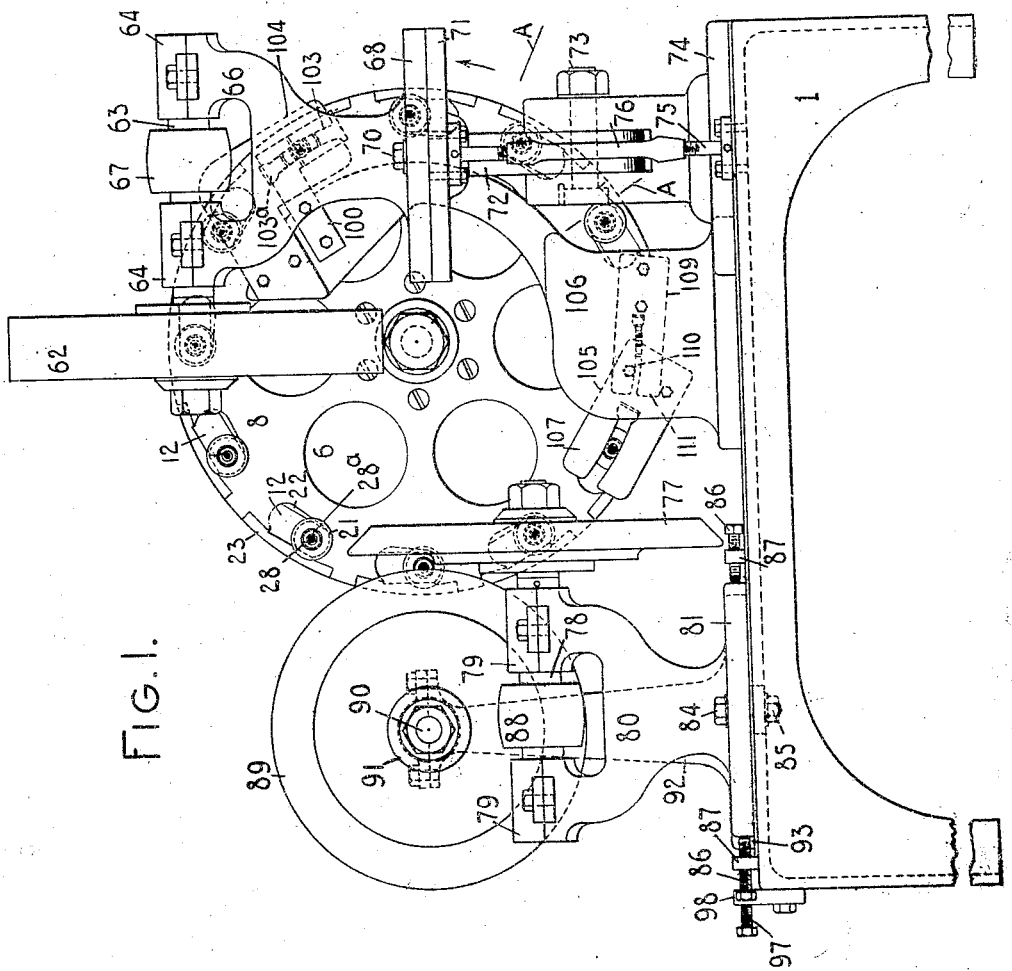

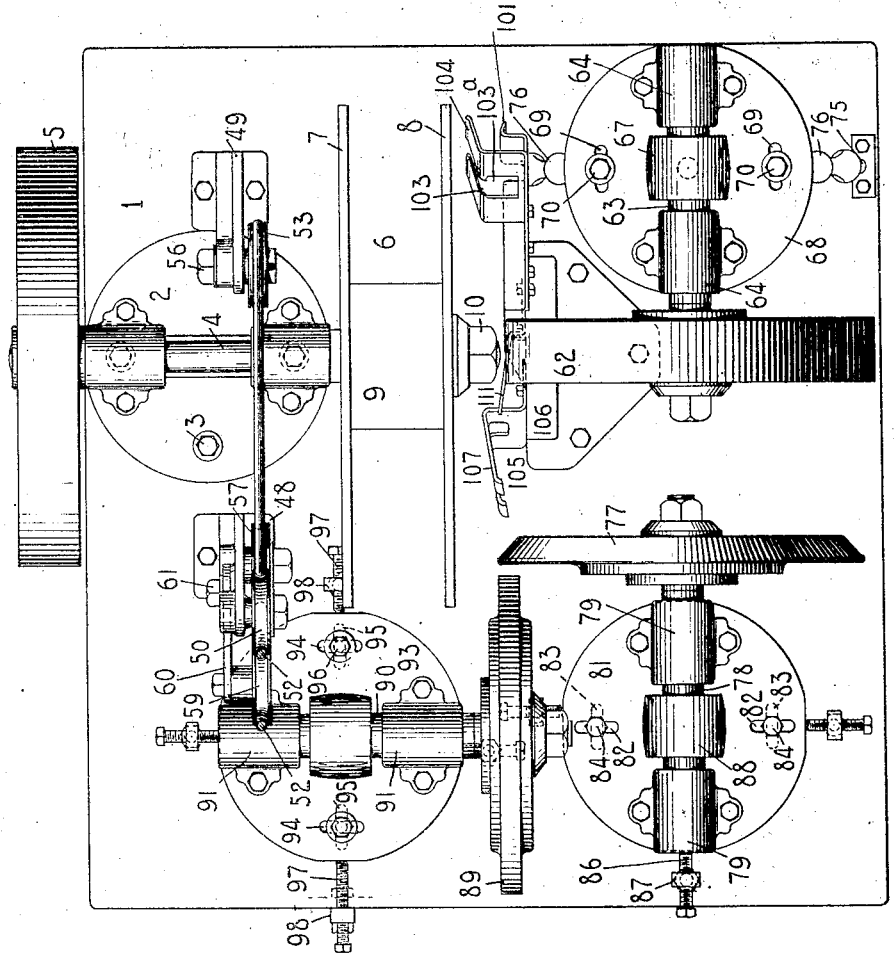

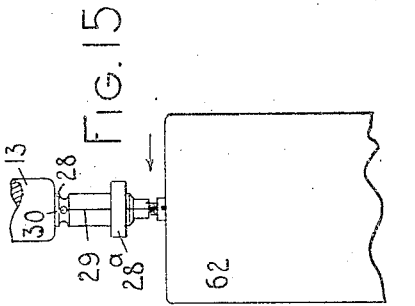
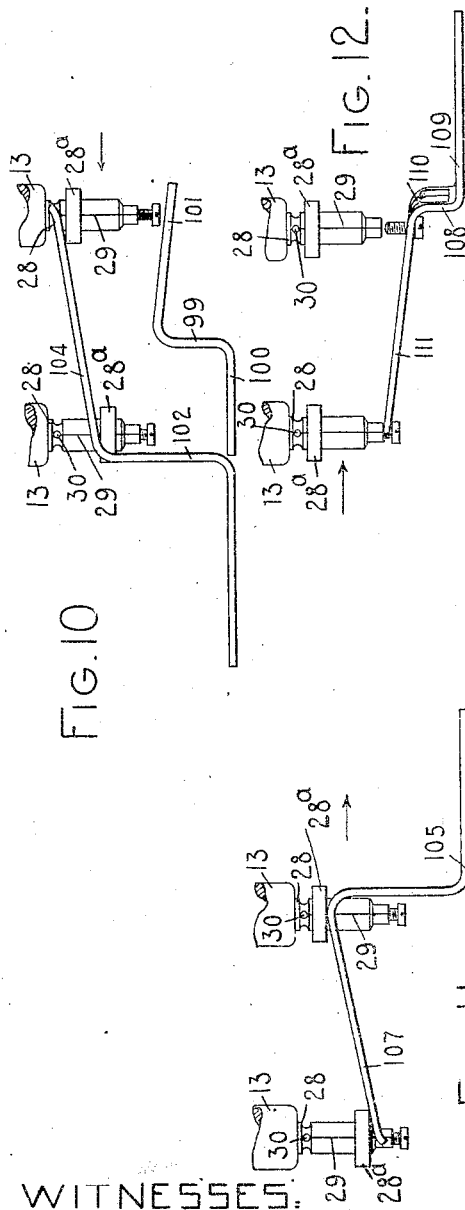

T. H. SCHESCH.
POLISHING MACHINE.
APPLICATION FILED JULY 13, 1909
1,043,973
Patented Nov. 12, 1912
6 SHEETS—SHEET 6.
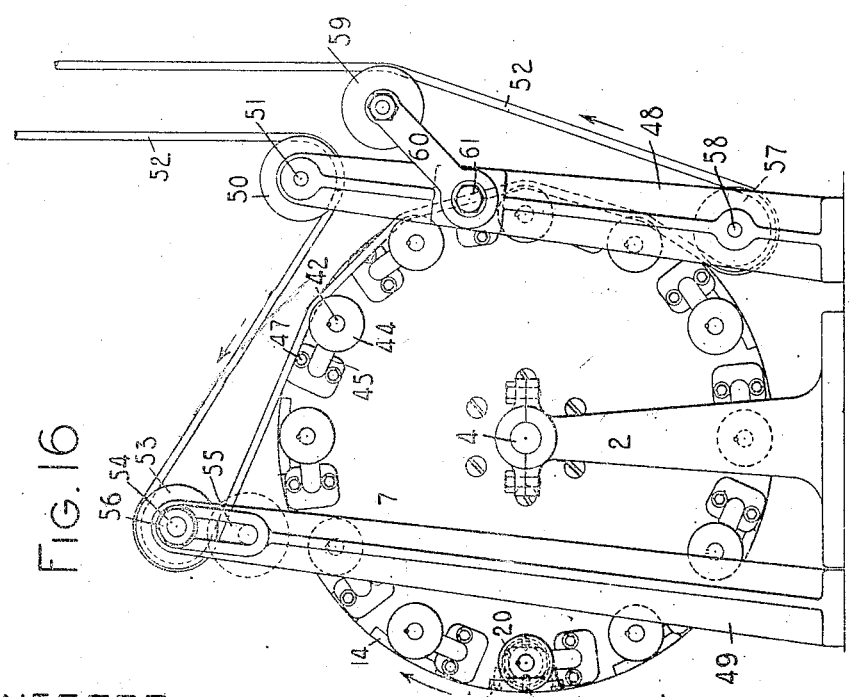
WITNESSES.
INVENTOR.
Theodore H Schesch
By Jacob Felbel
HIS ATTORNEY

UNITED STATES PATENT OFFICE.

THEODORE H. SCHESCH, OF ILION, NEW YORK, ASSIGNOR TO UNION TYPEWRITER COMPANY, OF JERSEY CITY, NEW JERSEY, A CORPORATION OF NEW JERSEY.

POLISHING-MACHINE.

1,043,973.  Specification of Letters Patent.  Patented Nov. 12, 1912.

Application filed July 13, 1909. Serial No. 507,338.

*To all whom it may concern:*

Be it known that I, THEODORE H. SCHESCH, citizen of the United States, and resident of Ilion, in the county of Herkimer and State of New York, have invented certain new and useful Improvements in Polishing-Machines, of which the following is a specification.

My invention relates to a machine capable of use for a variety of purposes but devised more particularly for polishing small articles such as screws, and the main object of the invention is to provide simple and efficient automatic means for polishing small articles such, for instance, as screws.

To the above and other ends which will hereinafter appear, my invention consists in the features of construction, arrangements of parts and combinations of devices to be hereinafter described and particularly pointed out in the appended claims.

In the accompanying drawings wherein like reference characters indicate corresponding parts in the various views, Figure 1 is a front elevation of a screw polishing machine embodying my invention. Fig. 2 is a plan view of the same with the chucks omitted. Fig. 3 is a detail side elevation of the carrier and the parts carried thereby. Fig. 4 is a detail sectional view showing a portion of the carrier and one of the screw carrying chucks and its driving spindle, the section being taken longitudinally of and centrally through the chuck driving spindle. Fig. 5 is a detail top view of the parts shown in Fig. 4. Fig. 6 is a detail side elevation of one of the polishing wheels and the adjustable supports on which it is mounted, the view showing the position of the parts as seen from the right in Fig. 1. Fig. 7 is a fragmentary face view with parts in section of one of the disks forming part of the carrier, together with certain of the parts carried thereby. Fig. 8 is a like view of the corresponding parts on the other disk of the carrier. Fig. 9 is a detail rear elevation of one of the pulleys for the chuck driving spindles, together with the adjustable bracket which carries the pulley and the shaft section on which the pulley is mounted. Fig. 10 is a diagrammatic detail top view showing two of the chucks and the means for positioning the screws in place in the chucks and for closing or locking the chucks. Fig. 11 is a diagrammatic top view showing two of the chucks and the means for opening the chucks to release the polished screws. Fig. 12 is a diagrammatic top view showing two of the chucks and the means for discharging the screws from the chucks after the screws are polished. Fig. 13 is a diagrammatic top view showing the manner in which what may be termed the second polishing wheel coöperates with the screw head. Fig. 14 is a diagrammatic top view showing the manner in which the beveled polishing wheel coöperates with the screw head. Fig. 15 is a diagrammatic top view showing the manner in which what may be termed the first of the polishing wheels coöperates with the head of a flat headed screw. Fig. 16 is a detail rear elevation of the carrier and certain of the parts associated therewith. Fig. 17 is a fragmentary sectional view showing the means for adjusting one of the pulleys whereby the driving of the chuck shafts at certain periods is determined. Fig. 18 is a detail side view partly in section showing some of the pulleys and the means for supporting the same.

Heretofore it has been customary to polish screws or screw heads separately by hand preparatory to nickel-plating, bluing, etc., said screws. The machine of my present invention was devised more particularly to provide automatic means for polishing screws or screw heads quickly and efficiently so that the screws need not be handled from the time they are introduced into the machine, the screws being automatically discharged from the machine completely polished on all sides.

Briefly stated, the machine comprises, in the present instance, a rotary carrier on which a circularly arranged series of clamps or chucks is mounted, these chucks being automatically rotated on the carrier as the latter is rotated to move the screws past a plurality of polishing wheels disposed so as to act on different sides of the screw or screw heads. The screws are introduced into the chucks by hand and as the carrier rotates the screws are automatically positioned in the chucks and the chucks are automatically closed or locked on the screws. As the rotation of the carrier continues the screws are carried past the polishing wheels and are polished by said wheels under spring pressure. After the screws are polished the chucks are automatically opened to release the screws and the screws are automatically withdrawn from the chucks and are discharged into a suitable receptacle. The action of the machine is continuous, the different steps being successively and automatically effected. The only hand operation required is to place the screw heads outermost in the chucks as the carrier revolves.

The base frame or bed plate 1 of the machine supports the various working parts. A standard 2 is supported on the base 1 and is fixed thereto by bolts 3. The standard is provided with journal bearings for a shaft 4 carrying a driving pulley 5 at one end thereof and what may be termed a rotary carrier is fixed at the other end of the shaft. This carrier as a whole is designated by the reference numeral 6 and comprises two parallel flanges or disks 7 and 8 and an intermediate hub 9 connecting the disks. The carrier is fixed to the shaft by any suitable means and is held thereon by a nut 10. A series of circularly arranged openings 11 and 12 extend through the disks 7 and 8 respectively and a series of shafts 13 extend through bearing members received in the openings in both of said disks. By referring to Fig. 7 it will be seen that each of the openings 11 has a closing block 14 which closes the mouth of its opening and which is secured to the disk 7 by screws 15. Each block 14 carries an adjustable pivot screw 16, and an oppositely disposed pivot 17 projects from a wall of each opening 11. Opposite flat bearing faces 18 and 19 are formed on each block 14 and on the opposite wall of the associated opening 11 respectively. These bearing faces coöperate with corresponding bearing faces on a bearing block or member 20 having openings in which the pivots 16 and 17 extend to pivotally connect the bearing member 20 to the disk 7. A shaft 13 extends freely through and receives a bearing at its rear end portion in the bearing block 20 so that the shaft may turn in its bearing and may be swung into or out of parallelism with the driving shaft 4 of the carrier. The forward end portion of each shaft 13 likewise extends through a bearing block 21 (see Fig. 8). This bearing block is flattened on opposite sides thereof where it coöperates with detachable bearing plates 22 and 23. Each plate 23 closes the mouth of its opening 12 and is secured in place by screws 24. Each plate 22 is secured in place by a screw 25. Each opening 12 is elongated as indicated in Fig. 8 in order to afford a sliding movement of the bearing member 21 longitudinally of the opening 12. A screw 26 is received in a tapped opening in each block or plate 23 and the pointed end of the screw is adapted to be received in an opening in the bearing member 21 in order to secure the bearing block against movement along the slot or opening 12 and to maintain the bearing block in the position shown in full lines in Fig. 5. In this position the shaft 13 is parallel with the driving shaft 4 of the carrier. When, however, the screw 26 is disengaged from the bearing block 21, the bearing block may be shifted laterally along the slot or opening 12 in order to change the shaft 13 on the carrier from the full to the dotted line position shown in Fig. 5 so as to present the article to be polished at a different angle to the polishing devices as will hereinafter more clearly appear. In this shifting of a shaft 13 the rear bearing block 20 turns on the pivots 16 and 17. The so-called bearing blocks 22 and 23 in addition to forming bearings on which the bearing members 21 may be shifted along the slots 12 also constitutes clamping plates, so that when a bearing member 21 is shifted along its slot 12 to the position shown in dotted lines in Fig. 5, the screws 24 may be employed to cause the plate 23 to bear with sufficient force against the bearing member 21 to maintain it in its adjusted position.

The forward end of each shaft or spindle 13 is apertured as indicated at 27 for the reception of a detachable clamp or chuck which is designated as a whole by the reference numeral 28. From an inspection of Figs. 4 and 5 it will be seen that this chuck is a split chuck having a longitudinal slit 29 therein and a lateral transverse opening 30 extending therethrough at the termination of the slit 29. Each chuck is apertured at 31 between the outwardly pressing jaws for the reception of the stem of a screw to be polished and each chuck is opened or closed by a sliding ring, sleeve or collar 28ª which presses the jaws together and locks them when the sleeve is at the forward or outer end of the chuck as shown in Fig. 5. Each chuck 28 is detachably secured in the recess 27 of its spindle or shaft 13 by a set screw 32. The aperture 31 extends longitudinally through the chuck and receives a positioning spindle 33, headed at 34 for coöperation with a screw 35 threaded in an opening 36 in the rear end of the chuck. An adjustment of the screw 36 determines the longitudinal position of the spindle 33 in the chuck and the forward end of said spindle constitutes a bearing for the screw inserted in the opening 31 and limits the rearward movement of the screw in the chuck. These means therefore provide for projecting the headed ends of the screws from the chucks a predetermined distance, in order that the various screws may project from their chucks the requisite distance to coöperate properly with the polishing wheels and to provide for polishing screws of various lengths. The rear end of each of the spindles or shafts 13 is provided with a collar 37 fixed thereto by a pin 38. Each collar 37 co-acts with the associated bearing member 20 to limit the forward movement of the spindle or shaft 13 in its bearings. A coiled expansion spring 39 surrounds each spindle 13 and bears at its rear end against the associated bearing 20 and at its forward end against a shoulder 40 formed on the associated spindle 13. Each of the springs 39 is therefore effective to press the associated spindle 13 forward to the limit of its longitudinal motion controlled by the sleeve 37 co-acting with the bearing member 20. Each shaft or spindle 13 is connected at its rear end by a universal joint 41 with a short driving spindle 42 received in a bearing 43. The rear end of each spindle 42, where it extends beyond its bearing 43, is provided with a pulley 44 secured to the driving spindle. The universal joint connecting each pair of shafts or spindles 13 and 42 may be of any suitable construction which will transfer the rotative motion of a spindle 42 to its connected spindle 13 and will allow of an adjustment of the spindle 13 to either the full or dotted line position shown in Fig. 5 without affecting the transmission of power from the pulley 44 to its spindle 13. Each bearing 43 has a bracket 45 with a foot-piece slotted at 46 (see Fig. 9) for the reception of headed screws 47 received in tapped openings in the disk 7. The slots 46 for each bracket 45 are parallel and extend longitudinally in a direction which will afford a movement of the bracket 45 from the full to the dotted line position in Fig. 5 when the associated shaft 13 is adjusted around its pivots 16 and 17 from the full to the dotted line position. In short, the position of each pair of slots 46 is such that the slots enable the associated bracket 45 to be adjusted to correspond to the adjustment of the associated shaft 13 and its bearing members which receive a swinging movement around the pivots 16 and 17. The screws 47 secure each bracket 45 in adjusted position when the screws are tightened.

From an inspection of Figs. 16, 17 and 18 it will be seen that standards 48 and 49 are secured to the main frame or base 1 of the machine and project upwardly therefrom in the rear of the rotary carrier 6. The upper end of the standard 48 has a grooved guide pulley 50 mounted thereon through a spindle or shouldered screw 51 which projects laterally from the standard. The pulley 50 co-operates with the driving belt 52 which moves in the direction of the arrow in Fig. 16 and passes over a grooved guide pulley 53 that turns on a spindle 54. This spindle is received in a substantially vertically disposed slot 55 in the upper end of the standard 49. A nut 56 secures the spindle 54 in either the full or dotted line position shown in Fig. 16. The purpose of this adjustment of the pulley 53 will hereinafter more clearly appear. The driving belt passes around the guide pulley 53, thence to a guide pulley 57 mounted on a spindle 58 which projects laterally from the standard 48. In the movement of the belt 52 from the pulley 53 to the guide pulley 57, the belt is adapted to coöperate with a plurality of the driving pulleys 44 which actuate the screw-receiving chucks. When the guide pulley 53 is adjusted to the full line position in Fig. 16 the driving belt is adapted to coöperate with, say, four of the driving pulleys 44 at one time and as the carrier 6 revolves, successive driving pulleys 44 will be brought into coöperation with the driving belt 52. If, however, the guide pulley 53 be adjusted to the lowermost position shown in dotted lines in Fig. 16, the belt 52 will be brought into coöperation with the driving pulleys at an earlier period in the rotation of the carrier and some five of the driving pulleys 44 will be rotated at one time. As the driving belt 52 passes from the guide pulley 57 it coöperates with a grooved guide and take-up pulley 59 pivoted on an arm 60 pivoted at 61 to the standard 48. The arm 60 is thus adapted to receive a swinging movement around the pivot 61 in order to take up any undue slack in the belt 52 or to afford more slack if desired. As the carrier is revolved in the direction of the arrow in Fig. 16 the pulleys 44 are successively brought into coöperation with the driving belt and the chucks are successively rotated to effect a turning movement of the screws carried by the chucks.

What may be termed the first of the series of polishing wheels is the polishing wheel 62 which may be made of any suitable material, but which in the present instance is preferably made up of a wooden core and the contact face thereof is built up of bull neck or Buffalo leather set in edgewise and glued up with emery or other like material. This polishing wheel 62 is mounted on a driving shaft 63 which rotates in journal bearings 64 in a standard 66. A driving pulley 67 is secured to the shaft 63 between the bearings 64, this pulley being driven by a suitable belt to rotate the polishing wheel 62. A disk-like foot-piece 68 forms the base of the standard 66 and has slots 69 therein which are concentric with a vertical pivot 69$^a$ therein (see Fig. 6) on which the standard is adapted to turn. These slots 69 receive screws 70 which take into tapped openings in a disk-like member 71 which corresponds to the foot-piece 68 and likewise receives the pivot 69$^a$. By mounting the standard 66 in the manner described it may receive a rotative adjustment around the vertical pivot 69ª to effect an angular adjustment of the face of the polishing wheel 62 with reference to the screw heads with which it coöperates. The disk-like support 71 has a depending portion 72 pivotally connected at 73 to a base 74 secured to the frame or base 1 of the machine. The pivot 73 extends at right angles to the axis of the pivot 69ª and affords a swinging adjustment of the members 71, 68, 66 and the polishing wheel 62 toward and away from the ends of the screws to be polished. A two-part bolt 75 with right and left-hand screw threads united by a turn buckle 76 is provided at the front and rear of the support 66—72 for the polishing wheel 62 as shown in Figs. 1 and 6. The upper end of each two-part bolt is secured to the disk-like supports 71 whereas the lower end of each two-part bolt is secured to the base 1 of the machine. These devices provide means whereby an adjustment of the member 72 and the parts carried thereby may be effected around the pivot 73 to swing the polishing wheel 62 toward and away from the screws to be polished. It should be understood that these means for effecting various adjustments of the polishing wheel 62 are primarily employed when setting the machine up and that ordinarily no change in the adjustment is required unless the character of the articles to be polished is materially changed. The screws are first brought into contact with the polishing wheel 62 and are moved past the polishing wheel so as to present the ends of the heads of the screws to the polishing wheel. In case the screw heads are flat or beveled heads of the character shown in Figs. 15 and 14 respectively the polishing wheel 62 co-acts with the flattened end of the head in the manner shown in Fig. 15, the screw passing the face of the wheel in the general direction of the arrow. In polishing flat or beveled headed screws the driving spindles 13 are preferably positioned with their axes parallel to the driving shaft 4 as indicated in Fig. 3 and in full lines in Fig. 7 and the pulley 53 is shifted to the full line position shown in Fig. 16 so that the chucks will not be rotated when the screws carried thereby are being acted upon by the polishing wheel 62.

The screws are successively moved from the polishing wheel 62 to a beveled polishing wheel 77 which is preferably made of the same materials as the wheel 62. The beveled contact face of the wheel coöperates with the head of the screw as indicated in Fig. 14 at which time the chuck which carries the screw is being rotated by the belt 52 so that if the screw happens to have a beveled head as indicated in this figure the beveled portion of the head will be effectively polished. This beveled polishing wheel is secured to a driving shaft 78 mounted in bearings 79 of an upright standard or support 80 provided with a disk-like foot-piece 81. The foot-piece rests on the base 1 of the machine and is provided with radial slots 82 on four sides thereof. Crossing the slots 82 are slots 83 provided in the bed plate or base 1 of the machine and screw bolts 84 extend through the slots 82 and 93 to afford an adjustment of the foot-piece 81 and the parts carried thereby. Nuts 85 coöperate with the screw bolts 84 to secure the parts in their adjusted positions. Set screws 86 are threaded through apertured lugs 87 on the base of the machine and bear against the edge of the foot-piece 81 on four sides thereof in order to effect an adjustment of the foot-piece and the parts carried thereby either fore and aft of the machine or sidewise and to secure the foot-piece and the parts carried thereby in the positions to which they are adjusted. The shaft 78 which carries the polishing wheel 77 is provided with a pulley 88 intermediate the journal bearings 79, said pulley coöperating with a suitable belt by which the polishing wheel 77 is driven.

After the screws are carried by their carrier past the polishing wheels 62 and 77 the sides of the screws, or the sides of the heads of the screws, are brought into contact with a polishing wheel 89 which is preferably constructed of the same materials as the previously described polishing wheels. This wheel 89 is carried upon a shaft 90 that rotates in bearings 91 on a standard 92 provided with a foot-piece or disk 93 similar to the foot-piece 81, and like the foot-piece 81 the foot-piece 93 and the parts carried thereby are mounted for adjustment on the bed plate 1 of the machine. Thus, the part 93 has slots 94 therein on four sides and beneath these slots the bed plate 1 of the machine has slots 95 which extend at right angles to the slot 94. Screw bolts 96 pass through each associated pair of slots 94 and 95 to afford an adjustment of the foot-piece 93 and the parts carried thereby in directions at right angles to each other. Set screws 97 are received in threaded lugs 98 on the base of the machine and bear against the edges of the foot-piece 93 on four sides thereof to effect a fore and aft or sidewise adjustment of the foot-piece. By the means described the three polishing wheels may be adjusted to properly co-act with the articles to be polished so that articles of different size and shape may be polished. It will be observed, moreover, that the polishing wheels co-act with each screw or other article to be polished on all sides thereof to efficiently polish the articles as they are successively carried past the polishing wheels. The removability of the chucks or clamps 28 from the driving spindles 13 provides for the substitution of different sizes of forms of chucks or clamps when such substitution is deemed necessary.

When it is desired to polish round headed screws, for instance, the shafts 13 are each adjusted to the position shown in Fig. 5 where their axes are thrown out of parallelism with the driving shaft 4 of the chuck carrier 6 and the pulley 53 is then adjusted to the position shown in dotted lines in Fig. 16 so that each chuck as it is moved with the carrier past the polishing wheel 62 will receive a rotation through its driving pulley 44 by reason of the fact that at this time the driving belt 52 is positioned where it will coöperate with each driving pulley 44 when the associated chuck is in a position where the screw carried by the chuck contacts with the first polishing wheel 62. The effect of the rotation of each inclined shaft or spindle 13 while the screw carried thereby is passing the first polishing wheel is to polish the head of a round headed screw on all sides, the polishing wheel 62 being what may be termed a soft polishing wheel in which the head of a screw is adapted to be embedded. At the time when any screw is in contact with the polishing wheel 62 or 77 it is maintained against the face of the wheel by the expansion spring 39, forcing the shaft 13 longitudinally in its bearings so that the polishing effected by these wheels is under pressure of the springs 39.

The screws are placed in the chucks by hand as the chucks pass successively between the points indicated by the lines A, A in Fig. 1, it being understood that the chucks at this time are open, ready to receive a screw. The operator places a screw in each open chuck as it passes between the points indicated, with the head outermost or forward. In the event of the operator failing to accurately position a screw in a chuck, or in the event of the screw working loose in the chuck before the latter is closed or locked, the screw is automatically positioned in its chuck. Thus after the screws are introduced and as the carrier 6 continues to revolve the chucks are carried around in the direction of the arrow in Fig. 1 until they are brought successively into contact with a fixed positioning device or plate 99 shown in detail in Fig. 10. This positioning device is in the nature of an angular plate secured by its foot-piece 100 to a standard 106 fixed to the bed plate of the machine. The positioning plate has an inclined face or cam 101 with which the heads of the improperly positioned screws are adapted to coöperate as they pass the fixed positioning plate, as indicated in Fig. 10. The effect of the screws coöperating with the cam face 101 is to successively push the screws rearwardly in the open chucks until the rear end of each screw is brought into contact with the adjustable spindle 33 contained in the associated chuck and thus properly position the screw in the chuck. As each chuck is being carried past the positioning plate 99 in the manner described a fixed bifurcated actuating device 102 formed as an angular plate and provided with a slot 103 (see Fig. 2) coöperates with the ring or sleeve 28ᵃ by which the chuck is closed and locked, as indicated in Fig. 10. This locking device 102 is fixed by its foot-piece to the standard 106 and has the inclined part 104 which overlaps and extends in the rear of the positioning device 99. This part 104 is bifurcated to receive the chucks successively in the slot 103 as the chucks move around with the carrier. As a chuck enters the slot 103 the ring or sleeve 28ᵃ is brought into contact with the forward inclined side of the portion 104 of the device and as the chuck continues to move with its carrier in the direction of the arrow in Fig. 10 the locking sleeve 28ᵃ will be forced from the rear end portion of the chuck to the outer end portion thereof as shown at the left-hand side of Fig. 10. This movement of the sleeve 28ᵃ is effective to force the jaws of the chuck together and lock the chuck, the screw being clamped by the chuck before the screw is out of control of the positioning device 99. The forward end of the slot 103 is enlarged as indicated at 103ᵃ in Fig. 2 to permit the sleeve 28ᵃ on each chuck to pass through the enlargement after the chuck has been locked so that the fixed closing device 102 will not obstruct the movement of the chucks with the carrier. As the chucks are successively locked to clamp the screws in place they are brought into contact successively with the polishing wheels 62, 77 and 89 as previously described. The chucks are then successively moved past a fixed releasing device 105 secured by its foot-piece to the standard 106. The unlocking or releasing member 105 is formed like the locking member 102 except that the cam or inclined face 107 thereof is inclined in the opposite direction from the member 102 and the opposite face of the incline 107 coöperates with the locking sleeves 28ᵃ. As the chucks move successively past the releasing device 105 in the direction of the arrow in Fig. 11, each locking sleeve 28ᵃ first co-acts with the lowest portion of the cam face 107. During the further movement of the carrier the locking sleeve is moved by the cam from the locking position at the outermost portion of the chuck to the unlocked position near the inner or rear end of the chuck before the chuck passes the releasing device, so that the chucks are automatically and successively opened to release the screws. A further movement of the rotative carrier is effective to bring the screws into coöperation with a bifurcated discharging device 108 as shown in Fig. 12. This device is secured by its foot-piece 109 to the standard 106. The discharging device is slotted at 110 longitudinally of its cam portion 111 to receive the stem of each screw as it passes along in the direction of the arrow in Fig. 12. In this movement the head of each screw coöperates with the forward cam face of the discharging device to withdraw the screw from the chuck as indicated near the right in Fig. 12 and to discharge the screw into a suitable receptacle provided for the reception of the screws.

From the foregoing description it will be understood that the screws are not handled from the time they are introduced into the chucks by the operator and they are discharged from the machine automatically after they are completely polished. It will be understood that the various operations are successive ones and that the opening and closing of the chucks is automatically effected during the continuous operation of the machine and that I have provided a simple and efficient machine for automatically and speedily polishing screws.

While I have referred herein more particularly to polishing screws it should be understood that my invention may be embodied in various forms, and may be employed for polishing or grinding different articles where it is desired to automatically convey the articles to and from a polishing or grinding device and to effectively grind or polish the articles on all sides thereof and to discharge the articles from the machine after the polishing or grinding has been effected, and that various changes may be made without departing from the spirit and scope of my invention.

What I claim as new and desire to secure by Letters Patent, is:—

1. In a machine for polishing the heads of screws, the combination of a plurality of polishing wheels, means for rotating said polishing wheels, a rotary carrier for successively feeding a plurality of screws which are to have their heads polished past said polishing wheels, the different polishing wheels having their contact faces coöperating with the screw heads at different angles so that all of the different surfaces of the heads may be polished, and automatically operating means for turning each screw on its rotary carrier and while the head of the screw is in contact with said wheels.

2. In a machine for polishing the heads of screws, the combination of a polishing wheel. means for rotating the same, a carrier for the screw to be polished, a clamp which engages said screw, said clamp being carried by the carrier, means for opening said clamp to release the screw and automatically actuated means for disengaging the polished screw from said clamp, said disengaging means comprising a fixed disengaging device which engages the head of the screw as the screw is moved bodily with the carrier and thus withdraws the screw from the clamp.

3. In a machine for polishing the heads of screws, the combination of a polishing wheel, means for rotating said wheel, a carrier, a clamp which partly surrounds the screw to be polished, said clamp being carried by said carrier, automatically actuated means for opening and closing said clamp, and means for disengaging the polished screw from the clamp, said disengaging means comprising a relatively fixed disengaging device coöperative with the head of the screw as the screw is moved with the carrier and thus withdraw the screw from the clamp.

4. In a polishing machine, the combination of a polishing wheel, means for rotating said polishing wheel, a carrier, a clamp for the article to be polished, said clamp being carried by said carrier, automatically operating means for positioning the article in said clamp, and means for maintaining the article to be polished under spring pressure against the polishing wheel when the article is in contact with said polishing wheel.

5. In a polishing machine, the combination of a polishing wheel, means for rotating said polishing wheel, a carrier, a clamp for the article to be polished, said clamp being carried by said carrier, automatically operating means for opening and closing said clamp, means for maintaining the article to be polished under spring pressure against the polishing wheel when the article is in contact with said polishing wheel, and automatically actuated means for disengaging the polished article from the clamp after it is polished and the clamp has been automatically opened.

6. In a polishing machine, the combination of a polishing wheel, means for rotating said polishing wheel, a rotary carrier, a clamp for the article to be polished, said clamp being carried by said carrier, means for automatically positioning the article in said clamp, automatically actuated means for closing said clamp, means for maintaining the article to be polished under spring pressure against the polishing wheel when the article is in contact with said polishing wheel, and automatically actuated means for opening said clamp.

7. In a polishing machine, the combination of a polishing wheel, means for rotating said polishing wheel, a rotary carrier, a clamp for the article to be polished, said clamp being carried by said carrier, means for automatically positioning the article in said clamp, automatically actuated means for closing the clamp, means for maintaining the article to be polished under spring pressure against the polishing wheel when the article is in contact with said polishing wheel, automatically actuated means for opening the clamp, and automatically actuated means for disengaging the polished article from the clamp.

8. In a polishing machine, the combination of a plurality of polishing wheels operative on different surfaces of the article to be polished, means for rotating said polishing wheels, a rotary carrier, a plurality of clamps for the articles to be polished, said clamps being carried by said rotary carrier, automatically actuated means for rotating said clamps on said carrier, automatically actuated means for successively closing said clamps, and automatically actuated means for successively opening said clamps.

9. In a polishing machine, the combination of a plurality of polishing wheels operative on different surfaces of the articles to be polished, means for rotating said polishing wheels, a rotary carrier, a plurality of clamps for the articles to be polished, said clamps being carried by said rotary carrier, automatically actuated means for closing said clamps successively, means for maintaining the articles to be polished under a spring pressure when they are in contact with said polishing wheels, and automatically actuated means for successively opening said clamps after the articles are polished.

10. In a polishing machine, the combination of a plurality of polishing wheels operative on different surfaces of the articles to be polished, means for rotating said polishing wheels, a rotary carrier, a plurality of clamps for the articles to be polished, said clamps being carried by said rotary carrier, automatically actuated means for completely turning or rotating said clamps on said carrier, automatically actuated means for successively closing said clamps, means for maintaining the articles to be polished under spring pressure when they are in contact with said polishing wheels, and automatically actuated means for successively opening said clamps after the articles are polished.

11. In a polishing machine, the combination of a plurality of polishing wheels operative on different surfaces of the articles to be polished, means for rotating said polishing wheels, a rotary carrier, a chuck for the article to be polished, said chuck being carried by said rotary carrier, automatically actuated means for rotating said chuck on its carrier, means for maintaining the article to be polished under spring pressure when it is in contact with said polishing wheels, and automatically actuated means for discharging the article from the chuck.

12. In a polishing machine, the combination of a plurality of polishing wheels operative on different surfaces of the article to be polished, means for rotating said polishing wheels, a rotary carrier, a chuck for the article to be polished, said chuck being carried by said rotary carrier, means for automatically positioning the article in said chuck, automatically actuated means for turning the chuck on said carrier, means for maintaining the article to be polished under spring pressure when it is in contact with said polishing wheels, automatically actuated means for closing said chuck on the article to be polished, and automatically actuated means for opening the chuck after the article has been polished.

13. In a polishing machine, the combination of a plurality of polishing wheels operative on different surfaces of the article to be polished, means for rotating said polishing wheels, a rotary carrier, a chuck for the article to be polished, said chuck being carried by said rotary carrier, means for automatically positioning an article in the chuck, automatically actuated means for closing the chuck on the article to be polished, means for maintaining the article to be polished under spring pressure when it is in contact with said polishing wheels, automatically actuated means for opening the chuck after the article has been polished, and automatically actuated means for disengaging the polished article from the chuck.

14. In a polishing machine, the combination of a plurality of polishing wheels operative on different surfaces of the article to be polished, means for rotating said polishing wheels, a rotary carrier, a plurality of circularly arranged chucks for the articles to be polished, said chucks being carried by said rotary carrier, means for automatically positioning articles in said chucks as the rotary carrier turns, automatically actuated means for successively closing the chucks on the articles to be polished before said articles reach the polishing wheels, automatically actuated means for maintaining the articles to be polished under spring pressure when they are in contact with the polishing wheels, automatically actuated means for turning the chucks on the carrier, automatically actuated means for successively opening the chucks after the articles have been polished, and automatically actuated means for successively discharging the articles from the chucks.

15. In a polishing machine, the combination of a plurality of polishing wheels with the working faces thereof arranged at different angles relatively to the article presented thereto to be polished, means for rotating said polishing wheels, a carrier, a plurality of chucks for the articles to be polished, said chucks being carried by said carrier, and means for adjusting each of said polishing wheels to different set positions relatively to the articles to be polished.

16. In a polishing machine, the combination of a polishing wheel, means for rotating said polishing wheel, a rotary carrier, a plurality of chucks for the articles to be polished, said chucks being carried by said rotary carrier, and means for adjusting each of said chucks on its carrier to present the article carried thereby to the polishing wheel at different angles.

17. In a polishing machine, the combination of a polishing wheel, means for rotating said polishing wheel, a rotary carrier, a plurality of clamps or chucks for the articles to be polished, said clamps or chucks being carried by and circularly arranged on said rotary carrier, means for maintaining each article to be polished under spring pressure when it is in contact with said polishing wheel, and means for adjusting each clamp or chuck on its carrier to present the article carried thereby to the polishing wheel at different angles.

18. In a polishing machine, the combination of a polishing wheel, means for rotating said polishing wheel, a rotary carrier, a clamp or chuck for the article to be polished, said clamp or chuck being carried by said carrier, means for automatically turning the clamp or chuck on its carrier, and means for adjusting the clamp or chuck on its carrier to present the article carried thereby to the polishing wheel at different angles.

19. In a polishing machine, the combination of a polishing wheel, means for rotating said polishing wheel, a rotary carrier, a plurality of circularly arranged chucks for the articles to be polished, said chucks being carried by said rotary carrier, automatically actuated means for successively rotating said chucks on the carrier, and means for adjusting each of said chucks on its carrier to present the article carried thereby to the polishing wheel at different angles.

20. In a polishing machine, the combination of a plurality of polishing wheels, means for rotating said polishing wheels, a rotary carrier, a plurality of circularly arranged chucks for the articles to be polished, said chucks being carried by said rotary carrier, means for maintaining each article to be polished under spring pressure when it is in contact with a polishing wheel, automatically actuated means for successively turning said chucks, and means for adjusting each of said chucks on its carrier to present the article carried thereby to the polishing wheels at different angles.

21. In a polishing machine, the combination of a plurality of polishing wheels, means for rotating said polishing wheels, a rotary carrier, a plurality of circularly arranged chucks for the articles to be polished, said chucks being carried by said rotary carrier, means for maintaining each of the articles to be polished under spring pressure when it is in contact with the polishing wheel, automatically actuated means for rotating said chucks, means for adjusting each of said chucks on its carrier to present the article carried thereby to the polishing wheels at different angles, and means for automatically and successively positioning the articles in said chucks.

22. In a polishing machine, the combination of a plurality of polishing wheels, means for rotating said polishing wheels, a rotary carrier, a plurality of chucks for the articles to be polished, said chucks being carried by said rotary carrier, means for maintaining each of the articles to be polished under spring pressure when it is in contact with the polishing wheel, automatically actuated means for successively turning said chucks, means for adjusting each of said chucks on its carrier to present the article carried thereby to the polishing wheels at different angles, and automatically actuated means for successively opening and closing said chucks.

23. In a polishing machine, the combination of a plurality of polishing wheels, means for rotating said polishing wheels, a rotary carrier, a plurality of chucks for the articles to be polished, said chucks being carried by said rotary carrier, means for maintaining each of the articles to be polished under spring pressure when it is in contact with a polishing wheel, automatically actuated means for successively rotating said chucks on their carrier, means for adjusting each of said chucks on its carrier to present the article carried thereby to the polishing wheels at different angles, means for successively positioning the articles in the chucks, and automatically actuated means for successively opening and closing the chucks.

24. In a polishing machine, the combination of a plurality of polishing wheels, means for rotating said polishing wheels, a rotary carrier, a plurality of circularly arranged chucks for the articles to be polished, said chucks being carried by said rotary carrier, means for maintaining each of the articles to be polished under spring pressure when it is in contact with a polishing wheel, automatically actuated means for turning said chucks on their carrier, means for adjusting each of said chucks on its carrier to present the article carried thereby to a polishing wheel at different angles, and automatically actuated means for successively disengaging the polished articles from the chucks.

25. In a polishing machine, the combination of a plurality of polishing wheels, means for rotating said polishing wheels, a rotary carrier, a plurality of circularly arranged chucks for the articles to be polished, said chucks being carried by said carrier, automatically actuated means for maintaining each of the articles to be polished under spring pressure when it is in contact with a polishing wheel, automatically actuated means for rotating said chucks on their carrier, means for adjusting each of said chucks on its carrier to present the article carried thereby to the polishing wheels at different angles, means for automatically and successively positioning the articles to be polished in said chucks, automatically actuated means for successively closing the chucks on the articles to be polished, automatically actuated means for successively opening the chucks after the articles have been polished, and automatically actuated means for successively discharging the articles from the chucks after the articles have been polished.

26. In a machine for polishing the heads of screws which comprises a polishing wheel operative on the end of the head, a second wheel operative on the periphery of th[e] head, and means for conveying the screw past said wheels and against the polishin[g] surfaces thereof and presenting the hea[d] of the screws successively to said wheels [so] that the wheels are operative thereon in th[e] manner described.

27. In a machine for polishing the hea[d] of screws comprising three polishing whee[ls] with the working faces thereof arranged [at] three different angles and operative on end[,] corners and peripheries of the screw head[,] and means for carrying the screws successively past said polishing wheels and f[or] presenting the heads of the screws to th[e] working faces of said polishing wheels [so] that the latter are operative on the heads [in] the manner described.

Signed at Ilion, in the county of He[r]kimer, and State of New York, this ten[th] day of July A. D. 1909.

THEODORE H. SCHESCH.

Witnesses:
WILLIAM H. HURLEY,
CLARENCE L. NORTHWAY.

---

Copies of this patent may be obtained for five cents each, by addressing the "Commissioner of Paten[ts,] Washington, D. C."